US008606177B2

(12) United States Patent
Hwang et al.

(10) Patent No.: US 8,606,177 B2
(45) Date of Patent: Dec. 10, 2013

(54) APPARATUS AND METHOD FOR CONTROLLING HUMAN BODY CONTACT OF GROUND ELECTRODE, AND HUMAN BODY COMMUNICATION SYSTEM USING THE SAME

(75) Inventors: Jung-Hwan Hwang, Daejon (KR); Sung-Weon Kang, Daejon (KR); Kyung-Soo Kim, Daejon (KR); Jung-Bum Kim, Daejon (KR); In-Gi Lim, Daejon (KR); Chang-Hee Hyoung, Daejon (KR); Sung-Eun Kim, Seoul (KR); Duck-Gun Park, Daejon (KR); Jin-Kyung Kim, Daejon (KR); Hyung-Il Park, Daejon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 637 days.

(21) Appl. No.: 12/598,467

(22) PCT Filed: Mar. 21, 2008

(86) PCT No.: PCT/KR2008/001589
§ 371 (c)(1),
(2), (4) Date: Nov. 2, 2009

(87) PCT Pub. No.: WO2008/136578
PCT Pub. Date: Nov. 13, 2008

(65) Prior Publication Data
US 2010/0136906 A1   Jun. 3, 2010

(30) Foreign Application Priority Data

May 2, 2007   (KR) ........................ 10-2007-0042678

(51) Int. Cl.
| | |
|---|---|
| H04B 5/00 | (2006.01) |
| H04B 1/034 | (2006.01) |
| H04B 7/24 | (2006.01) |
| H04B 13/02 | (2006.01) |
| H03K 17/94 | (2006.01) |
| H03M 11/00 | (2006.01) |
| G08C 19/10 | (2006.01) |
| H04M 11/04 | (2006.01) |
| H04M 9/00 | (2006.01) |
| A61B 5/05 | (2006.01) |
| A61B 5/04 | (2006.01) |

(52) U.S. Cl.
USPC .............. 455/41.1; 455/100; 455/39; 341/32; 341/33; 340/852; 340/870.37; 379/38; 379/55.1; 600/547; 600/373; 600/382

(58) Field of Classification Search
USPC ............ 340/539.1, 539.11, 10.1, 10.3, 10.34, 340/562, 561, 407.1, 870.37, 563, 564, 340/825.71, 10.51; 455/41.1, 117, 276.1, 455/575.6, 422.1, 73, 41.2, 114.1, 63.1, 68, 455/556.1, 557; 345/156, 158, 157, 174; 375/219, 220; 600/301, 547, 27, 372; 379/38, 55.1; 341/33, 34, 32
See application file for complete search history.

(56) References Cited

U.S. PATENT DOCUMENTS

| | | | | |
|---|---|---|---|---|
| 5,811,897 | A   * | 9/1998 | Spaude et al. ................. | 307/149 |
| 6,211,799 | B1 * | 4/2001 | Post et al. ......................... | 341/33 |
| 6,223,018 | B1 * | 4/2001 | Fukumoto et al. ........... | 455/41.1 |
| 2004/0015058 | A1 * | 1/2004 | Besson et al. ................. | 600/301 |
| 2004/0019292 | A1 * | 1/2004 | Drinan et al. ................. | 600/547 |
| 2005/0244166 | A1 * | 11/2005 | Shinagawa et al. ........... | 398/186 |
| 2006/0252371 | A1 * | 11/2006 | Yanagida ..................... | 455/41.1 |
| 2008/0205904 | A1 * | 8/2008 | Shinagawa et al. ........... | 398/186 |

FOREIGN PATENT DOCUMENTS

| | | |
|---|---|---|
| JP | 2001-125704 | 5/2001 |
| JP | 2002-009710 | 1/2002 |
| JP | 2004-186833 | 7/2004 |
| JP | 2005-079900 | 3/2005 |

| JP | 2006-304373 A | 11/2006 |
| KR | 10-2006-0064472 A | 6/2006 |
| KR | 10-2007-0120761 A | 12/2007 |

OTHER PUBLICATIONS

International Search Report for PCT/KR08/001589 filed Mar. 21, 2008.
Written Opinion of the International Searching Authority for PCT/KR08/001589 filed Mar. 21, 2008.

* cited by examiner

*Primary Examiner* — Jennifer Mehmood
*Assistant Examiner* — Mirza Alam
(74) *Attorney, Agent, or Firm* — Jefferson IP Law, LLP

(57) ABSTRACT

Provided are an apparatus and a method for controlling human body contact of ground electrode, and a human body communication system using the same. The apparatus includes a resistance measuring unit for applying a predetermined voltage to a human body through a signal electrode, to measure a resistance value between the signal electrode and the ground electrode; a contact control unit for determining whether the ground electrode needs to contact the human body by using the measured resistance value, to provide control information associated with human body contact; and a contact performing unit for bringing the ground electrode into contact or out of contact with the human body according to the control information.

5 Claims, 3 Drawing Sheets

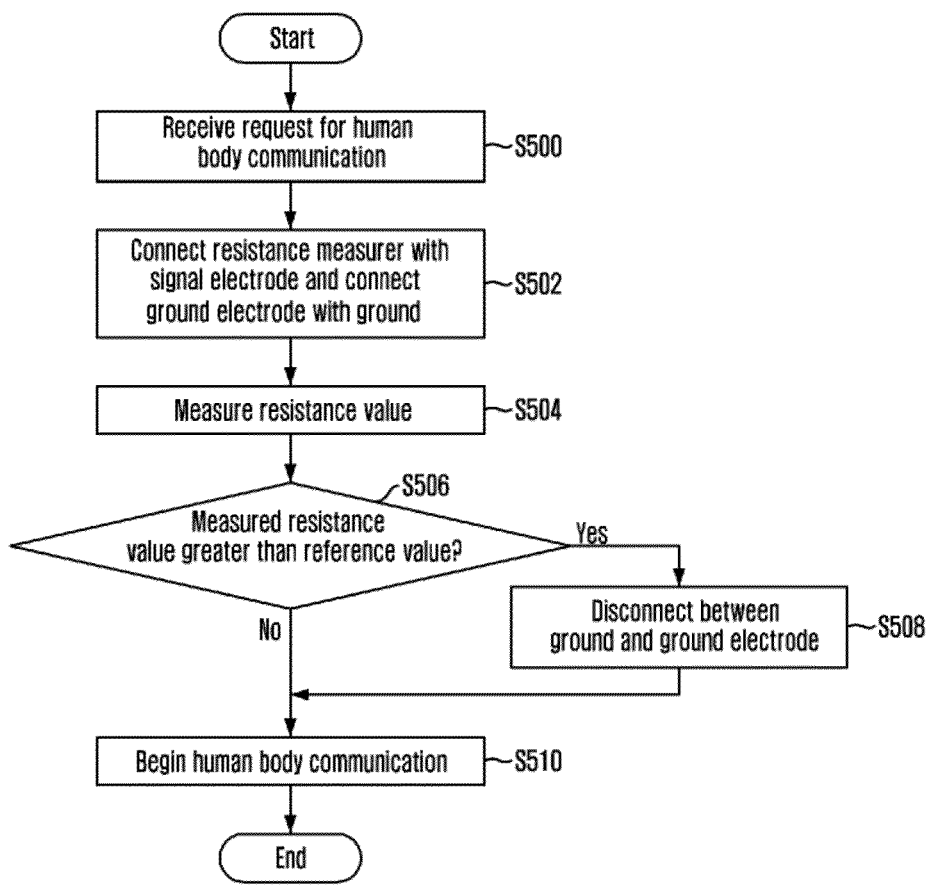

APPARATUS AND METHOD FOR CONTROLLING HUMAN BODY CONTACT OF GROUND ELECTRODE, AND HUMAN BODY COMMUNICATION SYSTEM USING THE SAME

TECHNICAL FIELD

The present invention relates to an apparatus and method for controlling human body contact of a ground electrode, and a human body communication system using the same; and, more particularly, to an apparatus and method for controlling human body contact of a ground electrode, and a human body communication system using the same, which can minimize signal loss and power consumption of a human body communication system by automatically controlling human body contact of the ground electrode according to a human body portion, e.g., a wrist or a fingertip that the human body communication system contacts.

BACKGROUND ART

In these days, many people are carrying devices such as personal digital assistants (PDAs), mobile phones, and medical equipment with them all the time. As a signal transfer method for transferring various data between those devices, there are a wired transmission method using a cable, and a wireless transmission method using, e.g., electric waves or light.

The wired transmission has advantages of high data security and high transmission speed, but is inconvenient because a user must carry a wiring device such as a cable all the time.

The wireless transmission is convenient in data transmission but has a limitation in that an economical price cannot be achieved because of needs for additional circuits for wireless transmission.

To overcome such a limitation, human body communication is being proposed, which uses a human body as a transmission medium. In the human body communication, a signal output through a transmitter of a communication device is applied to the human body through an electrode connected to the human body, and then is received by a receiver of another communication device through another electrode connected to the human body. The human body communication is convenient in use because no wiring device such as a cable is required, and can achieve an economical price because additional circuits for wireless transmission are not necessary.

FIG. 1 illustrates signal transfer in the human body communication. In the drawing, reference numbers 11, 12 and 10 indicate a signal transmitter, a signal receiver, and a human body, respectively.

A signal output from the signal transmitter 11 is applied to the human body 10, and is transmitted to the signal received through the human body 10. Through this signal transfer process, the human body communication is performed. Even if the signal transmitter 11 and the signal receiver 12 are individually provided in FIG. 1, they can be provided together in a dual human-body communication system.

FIGS. 2 and 3 illustrate influence of a ground electrode according to locations of a signal transmitter/receiver.

FIG. 2 shows signal loss decrement according to contact of a ground electrode with the human body at wrist and fingertip locations of the signal transmitter 11 in the case where the signal receiver 12 is placed at the right wrist and a corresponding ground electrode does not contact the human body. FIG. 3 shows signal loss decrement according to contact of a ground electrode with a human body at wrist and fingertip locations of the signal receiver 12 in the case where the signal transmitter 11 is placed at the left wrist and a corresponding ground electrode does not contact the human body. Each of the graphs according to the location of the signal transmitter/receiver represents a difference between a signal loss value when the ground electrode contacts the human body and a signal loss value when the ground electrode does not contact the human body.

Electrodes constituting a communication device for human body communication are divided into a signal electrode and a ground electrode according to their functions. The signal electrode is connected to an output signal line of a transmitter of the communication device or an input signal line of a receiver of the communication device, and serves to transmit/receive signal to/from the human body. The ground electrode is connected to a ground of the communication device. The characteristic of signal loss through the human body varies according whether the ground electrode contacts the human body.

To observe a signal-loss change according to the contact of the ground electrode with the human body, the decrement of the signal loss by contact of the ground electrode with the human body is experimented, and the experimental results are shown in FIGS. 2 and 3. The positive (+) decrement of the signal loss means that the signal loss decreases by the ground electrode, while the negative (−) decrement of the signal loss means that the signal loss increases.

FIG. 2 illustrates signal loss variations according to the contact of the ground electrode with the human body in the case where the signal transmitter 11 is placed at the left wrist and fingertip. Here, the signal receiver 12 is placed at the right wrist and a corresponding ground electrode does not contact the human body.

If the signal transmitter 11 is placed at the wrist 201, the signal loss decreases as the ground electrode of the signal transmitter 11 contacts the human body. In contrast, if the signal transmitter 11 is placed at the fingertip 202, the signal loss does not change or rather increases because of the ground electrode.

This is because the amount of electromagnetic field coupling of the ground electrode through the human body varies according to the location (wrist or fingertip) of the signal transmitter.

In more detail, if the signal transmitter 11 is placed at the wrist, an area of the human body contacting the ground electrode increases because of the relatively large area of the wrist, thereby increasing the amount of electromagnetic field coupling through the human body. Consequently, the signal loss decreases. However, if the signal transmitter 11 is placed at the fingertip, the area of the human body contacting the ground electrode is small because of a relatively small area of the fingertip, thereby reducing the amount of coupling. Consequently, the signal loss increases.

FIG. 3 illustrates variations of the signal loss by contact of the ground electrode with the human body with respect to the signal receiver 12, showing cases where the signal receiver 12 is placed at the right wrist 211 and the right fingertip 212, respectively. Here, the signal transmitter 11 is placed at the left wrist, and a corresponding ground electrode does not contact the human body.

As shown in FIG. 3, experimental results with respect to the signal receiver 12 are similar to experimental results with respect to the signal transmitter 11 as shown in FIG. 2. The cause of this phenomenon is also similar to the case of the signal transmitter 11 of FIG. 2.

From the experimental results of FIGS. 2 and 3, if the signal transmitter 11 or the signal receiver 12 for the human body communication is placed at the wrist (see 201 and 211 of FIGS. 2 and 3), the respective corresponding ground electrodes must contact the human body in order to reduce the signal loss.

However, if the signal transmitter 11 or the signal receiver 12 is placed at the fingertip (see 202 and 212 of FIGS. 2 and 3), the respectively corresponding ground electrodes should not contact the human body. The reason thereof will now be described.

The first reason is to prevent an increase in signal loss caused by the ground electrode. As described above, in the case where the signal transmitter 11 or the signal receiver 12 is placed at the fingertip, the contact of the ground electrode with the human body increases the signal loss.

The second reason is to reduce the amount of current consumed while flowing between a ground electrode and a signal electrode. The contact of the ground electrode with the human body causes a considerably large amount of current to flow between the signal electrode and the ground electrode through the human body. For example, in the case where the ground electrode contacts the human body in a band of about 5 MHz, if a voltage of about 3V is applied, a current of about 16 mA flows between the signal electrode and the ground electrode. In contrast, if the ground electrode does not contact the human body under the same condition, a current of about 0.2 mA flows. Accordingly, since the contact of the ground electrode with the human body does not reduce the signal loss or rather increases the signal loss, the amount of current being consumed can be reduced by brining the ground electrode out of contact with the human body. Accordingly, power being consumed by the signal transmitter 11 or the signal receiver 12 can be reduced.

As described above, signal loss and power consumption caused by the ground electrodes vary according to a human body portion, e.g., a wrist or a fingertip, which the signal transmitter/receiver 11/12 for human body communication contacts. For this reason, contacting the ground electrode with the human body all the time is very inefficient in terms of signal loss and power consumption.

DISCLOSURE OF INVENTION

Technical Problem

An embodiment of the present invention is directed to providing an apparatus and method for controlling human body contact of a ground electrode, and a human body communication system using the same which can minimize signal loss and power consumption of the human body communication system by automatically controlling human body contact of a corresponding ground electrode according to a human body portion, e.g., a wrist or a fingertip, which the human body communication system contacts.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for controlling human body contact for automatically controlling human body contact of a ground electrode, the apparatus including: a resistance measuring unit for applying a predetermined voltage to a human body through a signal electrode, to measure a resistance value between the signal electrode and the ground electrode; a contact control unit for determining whether the ground electrode needs to contact the human body by using the measured resistance value, to provide control information associated with human body contact; and a contact performing unit for bringing the ground electrode into contact or out of contact with the human body according to the control information.

In accordance with another aspect of the present invention, there is provided a method for controlling human body contact of a ground electrode, the method including: applying a predetermined voltage to a human body through a signal electrode, to measure a current flowing through the signal electrode and the ground electrode; calculating a resistance value between the signal electrode and the ground electrode by using the measured current value; and determining whether the ground electrode needs to contact the human body on the basis of the calculated resistance value, to control the human body contact of the ground electrode.

In accordance with another aspect of the present invention, there is provided a human body communication system for automatically controlling human body contact of a ground electrode, the human body communication system including: a human body communication processing unit for performing human body communication through a signal electrode; and a human body contact control unit for determining whether the ground electrode needs to contact the human body on the basis of a human body portion that the human body communication system contacts before the human body communication processing unit performs communication, to control the human body contact of the ground electrode.

Advantageous Effects

In accordance with the embodiments of the present invention, a human body portion, e.g., the wrist or fingertip, which a communication device for human body communication such as a signal transmitter/receiver is determined. According to the determination result, it is determined whether the ground electrode needs to contact the human body at the time of human body communication, to automatically control the human body contact of the ground electrode. Accordingly, signal loss and power consumption of the communication device can be minimized.

BRIEF DESCRIPTION OF THE DRAWINGS

FIG. 6 is a flowchart of a method for controlling human body contact, which can automatically control human body contact of a ground electrode in a human body communication system in accordance with the embodiment of the present invention.

BEST MODE FOR CARRYING OUT THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
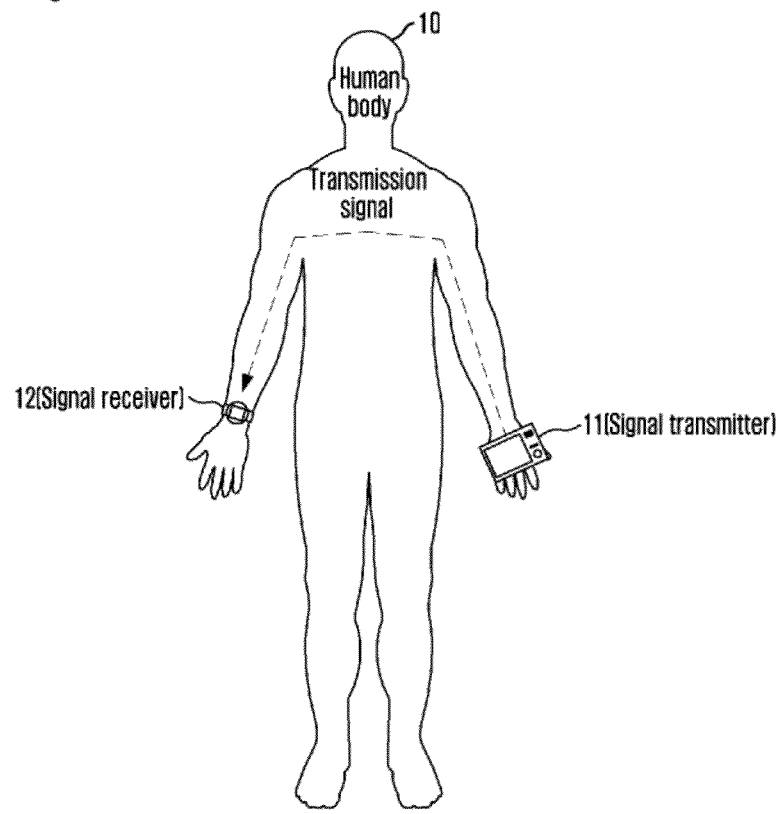
FIG. 1 illustrates signal transfer in human body communication.
Figure 2:
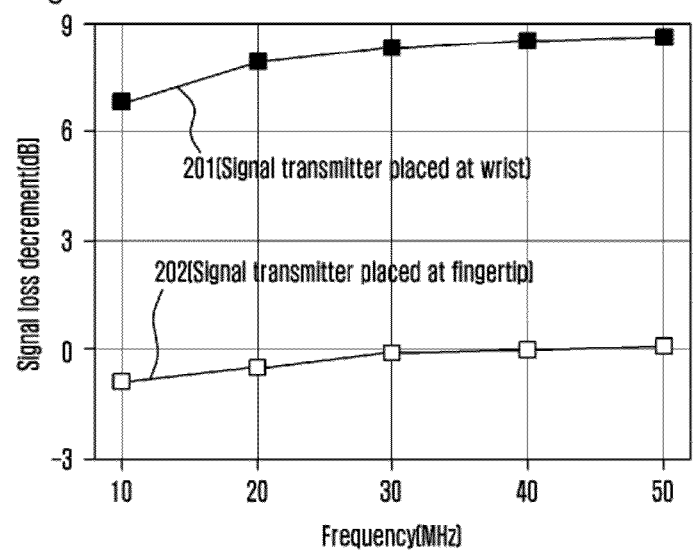
FIGS. 2 and 3 illustrate influence of a ground electrode according to locations of a signal transfer/receiver.
Figure 3:
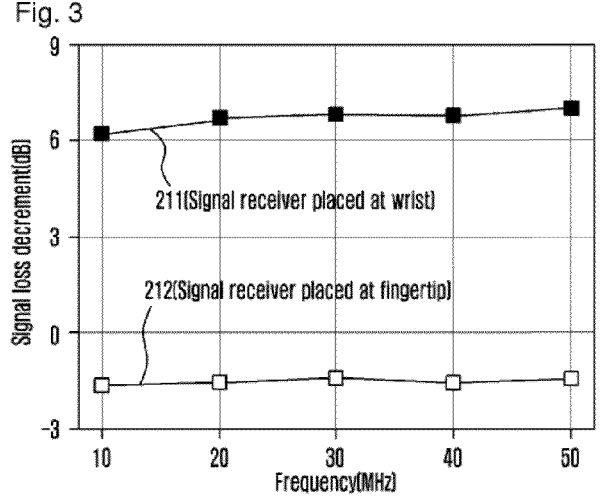
Figure 4:
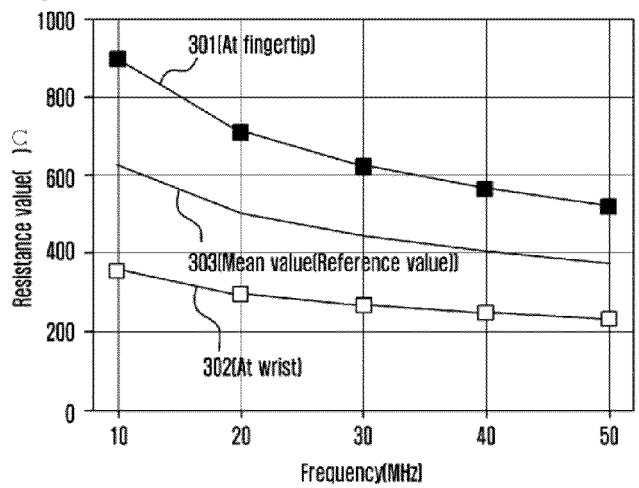
FIG. 4 illustrates a resistance value between a signal electrode and a ground electrode according to a location, e.g., a wrist/finger tip, of a signal transmitter/receiver when the ground electrode of the signal transmitter/receiver contacts a human body.

FIG. 4 illustrates a resistance value between a signal electrode and a ground electrode according to a location e.g., a wrist/fingertip, of a signal transmitter/receiver in the case where a ground electrode of the signal transmitter/receiver contacts a human body.

In order to determine whether the ground electrode of the signal transmitter 11 or the signal receiver needs to contact the human body, a location of the signal transmitter 11 or the signal receiver 12 must be determined. The determination can be performed by comparing a resistance value between the ground electrode and the signal electrode with a predetermined reference value.

FIG. 4 illustrates an experimental result of measuring resistance values between a signal electrode and a ground electrode at the wrist and the fingertip in the case where the ground electrode contacts the human body. In the case of the fingertip 301, an area of the human body contacting the electrode is small, and thus resistance between the signal electrode and the ground electrode is greater than that in the case of the wrist 302. Thus, the mean value of the resistance values at the wrist and the fingertip is set to a reference value 303. The reference value serves as a reference for determining the human body contact of the ground electrode. Thereafter, the resistance value measured between the signal electrode and the ground electrode is compared with the reference value. If the measured reference value is lower than the reference value, it is determined that the signal transmitter/receiver 11/12 is placed at the wrist. If the measured reference value is higher than the reference value, it is determined that the signal transmitter/receiver 11/12 is placed at the fingertip. According to the embodiment of the present invention, the human body contact of the ground electrode is automatically controlled based on such a determination result.

Figure 5:
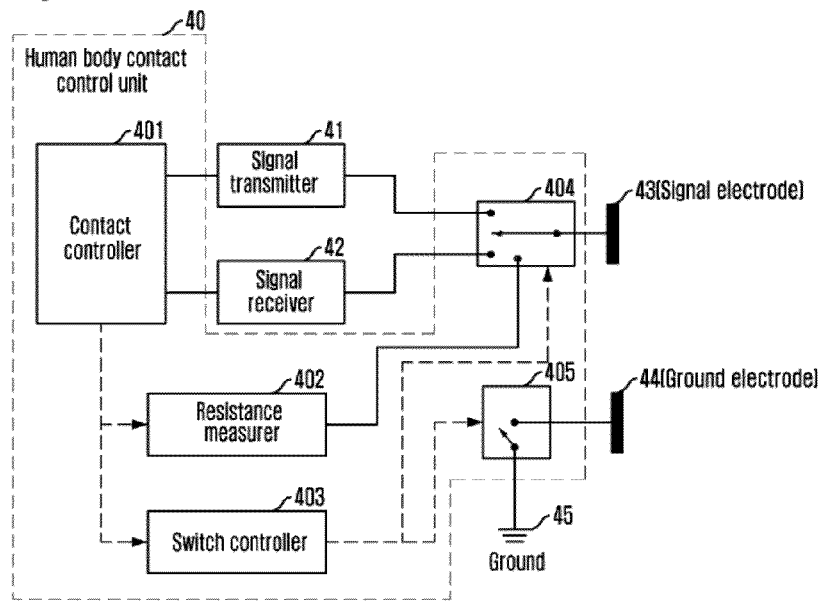
FIG. 5 is a block diagram of a human body communication system for automatically controlling human body contact of a ground electrode in accordance with an embodiment of the present invention.

FIG. 5 is a block diagram of a human body communication system for automatically controlling human body contact of a ground electrode according to an embodiment of the present invention.

The human body communication system according to an embodiment of the present invention includes a human body contact control unit 40 for automatically controlling human body contact of a ground electrode, a human body communication processing unit 41 and 42, a signal electrode 43, a ground electrode 44 and a ground 45. Each of the elements will now be described.

Before the human body communication processing unit 41 and 42 performs human body communication, the human body contact control unit 40 determines whether a corresponding ground electrode needs to contact the human body on the basis of a human body portion that the human body communication system contacts, to control the human body contact of the ground electrode. Specifically, the human body contact control unit 40 includes a contact controller 401, a resistance measurer 402, a switch controller 403, a signal-switching switch 404, and a ground electrode connection switch 405. The switch controller 403, the signal-switching switch 404, and the ground electrode connection switch 405 are collectively called a contact performing part.

The contact controller 401 controls the contact performing part 403 to 405 such that the resistance measurer 402 can measure resistance before human body communication is performed. That is, the signal-switching switch 404 is switched to be connected to the resistance measurer 402, and the ground electrode connection switch 405 is switched to be grounded through the ground part 45. Thereafter, the contact controller 401 determines the need for human body contact of the ground electrode 44 by using a resistance value obtained in the resistance measurer 402. That is, the contact controller 401 determines whether the ground electrode needs to contact the human body at the time of human body communication. Then, the contact controller 401 provides the control information associated with the human body contact. Also, the contact controller 401 may receive a predetermined request, e.g., a request for human body communication from a user via user interface.

That is, the contact controller 401 compares a resistance value measured in the resistance measurer 402 with a reference value. If the measured reference value is equal to or less than the reference value, the contact controller 401 provides human body contact control information for brining the ground electrode 44 into contact with the human body. If the measured resistance value exceeds the reference value, the contact controller 401 provides human body non-contact control information for brining the ground electrode 44 out of contact with the human body. The reference value is set to a means value of resistance values of the signal electrode 43 and the ground electrode measured at a wrist portion and a fingertip portion of the human body to which the human body communication system is to be attached (see FIG. 4.).

The resistance measurer 402 applies a specific voltage to the human body through the signal electrode 43, measures a current flowing through the signal electrode 43 and the ground electrode 44, and calculates a resistance value between the signal electrode 43 and the ground electrode 44. A level of the voltage being applied is set to be harmless to the human body. Preferably, a voltage that is higher than 0 V and is equal to or lower than 3 V may be used. According to embodiments, the resistance measurer 402 may be substituted with a current measurer that applies a voltage to the human body and measures the current flowing according to the applied voltage. In this case, the contact controller 401 may serve to calculate the resistance value by using the measured current value.

The contact performing part 403 to 405 brings the ground electrode into contact or out of contact with the human body under the control of the contact controller 401. In more detail, in the contact performing part 403 to 405, the switch controller 403 controls switching operations of the signal-switching switch 404 and the ground electrode connection switch 405 under the control of the contact controller 401. Then, the signal-switching switch 404 performs signal switching under the switching control of the switch controller 403. That is, the signal-switching switch 404 selectively connects the signal electrode 43 to one of the signal transmitter 41, the signal receiver 42 and the resistance measurer 402. The ground electrode connection switch 405 connects/disconnects the ground electrode 44 to/from the ground 45 under the switching control of the switch controller 403. According to the embodiment of the present invention, the operation for bringing the ground electrode 44 into contact or out of contact may be implemented by switching on/off the ground electrode connection switch 405 placed between the ground electrode 44 and the ground 45.

The human body communication processing unit 41 and 42 performs transmission/reception of a signal for human body communication, and may include at least one of the signal transmitter 41 and the signal receiver 42. If both the signal transmitter 41 and the signal receiver 42 are included in the human body communication processing unit 41 and 42, dual human body communication can be performed.

FIG. 6 is a flowchart of a method for controlling human body contact, which can automatically control human body contact of the ground electrode in the human body communication system according to the embodiment of the present invention.

In operation S500, the contact controller 401 receives a request for human body communication from a user via user interface. Then, before data transfer through the human body communication, the following procedures are performed in order to determine human body contact of the ground electrode 44.

In operation S502, the contact controller 401 connects the ground electrode 44 to the ground 45 of the human body communication system by controlling the ground electrode connection switch 405 through the switch controller 403. Also, in operation S502, the contact controller 401 connects the resistance measurer 402 to the signal electrode 43 by controlling the signal-switching switch 404 through the switching controller 403

In operation S504, the resistance measurer 402 calculates a resistance value between the signal electrode 43 and the ground electrode 44 by applying a predetermined voltage, e.g., about 3 V or lower to the human body through the signal electrode 43, measuring the resulting amount of current flowing through the signal electrode 43 and the ground electrode 44, and calculating a ratio of the application voltage and the amount of current flowing therein, i.e, based on Ohm's Law.

In operation S506, the contact controller 401 compares the resistance value calculated in the resistance measurer 402 with the reference value 303 of FIG. 4.

If the resistance value is equal to or less than the reference value, the contact controller 401 determines that the corresponding human body communication system is placed at the wrist, and thus provides the human body contact control information to the switch controller 403. Then, the switch controller 403 maintains a current state, i.e., an ON state of the ground electrode connection switch 405, thereby maintaining the human body contact of the ground electrode 44.

If the resistance value is higher than the reference value, the contact controller 401 determines that the corresponding human body communication system is placed at the fingertip, and thus provides the human body non-contact control information to the switch controller 403. In operation S508, the switch controller 403 controls the ground electrode connection switch 405 to disconnect the ground electrode 44 from the ground 45. The disconnection between the ground electrode 44 and the ground 45 of the human body communication system disconnects the ground electrode 44 from the human body communication system. This is identical to the case where the ground electrode 44 does not contact the human body in view of circuit.

After automatically controlling the human body contact of the ground electrode 44 in the above manner, in operation s510, the contact controller 401 begins signal transmission/reception through the human body by controlling the signal-switching switch 404 to perform on/off switching between the signal transmitter 41 and the signal receiver 42 through the switch controller 403.

The above described method according to the present invention can be embodied as a program and be stored on a computer readable recording medium. The computer readable recording medium is any data storage device that can store data which can be read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 10-2007-0042678, filed in the Korean Intellectual Property Office on May 2, 2007, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. An apparatus for controlling contact of a human body for automatically controlling human body contact of a ground electrode, the apparatus comprising:
   a contact controller for receiving a request for human body communication from a user via a user interface, for controlling a resistance measuring unit for measuring a resistance value between a signal electrode and the ground electrode by applying a predetermined voltage to a human body through the signal electrode, for comparing the measured resistance value with a predetermined reference value, for determining a position of the apparatus in the human body according to a result of the comparison, and for determining whether a connection between the ground electrode and the human body is to be maintained,
   wherein the contact controller determines maintaining of the connection if the measured resistance value is equal to or less than the reference value, and determines non-maintaining of the connection if the measured resistance value exceeds the reference value.

2. The apparatus of claim 1, further comprising
   a ground electrode connection switch to connect/disconnect the ground electrode to/from a ground of the apparatus; and
   a switching control unit for controlling the ground electrode connection switch by controlling of the contact controller.

3. The apparatus of claim 2, wherein the reference value is set to a mean value of resistance values between the signal electrode and the ground electrode, the resistance values being measured at the position including a wrist portion and a fingertip portion of the human body.

4. A method for controlling human body contact of a ground electrode, the method comprising:
   receiving a request for human body communication from a user via a user interface;
   measuring a resistance value between a signal electrode and the ground electrode by applying a predetermined voltage to a human body through the signal electrode;
   comparing the measured resistance value with a predetermined reference value, determining a position of the apparatus in the human body according to a result of the comparison; and
   determining whether a connection between the ground electrode and the human body is maintained, wherein the controlling of the human body contact of the ground electrode comprises:

determining maintaining of the connection if the calculated resistance value is equal to or less than the reference value, and determining non-maintaining of the connection if the calculated resistance value exceeds the reference value.

5. The method of claim 4, wherein the reference value is set to a mean value of resistance values between the signal electrode and the ground electrode, the resistance values being measured at the position including a wrist portion and a fingertip portion of the human body.

* * * * *